United States Patent
Metzler et al.

(10) Patent No.: US 9,635,519 B2
(45) Date of Patent: *Apr. 25, 2017

(54) APPARATUS, SYSTEM AND METHOD OF GROUP TRANSMISSION ACKNOWLEDGEMENT

(71) Applicant: Intel Corporation, Santa Clara, CA (US)

(72) Inventors: Benjamin T. Metzler, Beaverton, OR (US); Emily H. Qi, Portland, OR (US); Christian Maciocco, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 14/104,025

(22) Filed: Dec. 12, 2013

(65) Prior Publication Data

US 2014/0098735 A1    Apr. 10, 2014

Related U.S. Application Data

(63) Continuation of application No. 11/657,544, filed on Jan. 25, 2007, now abandoned.

(51) Int. Cl.
*H04W 4/00* (2009.01)
*H04W 4/06* (2009.01)
(Continued)

(52) U.S. Cl.
CPC ............ *H04W 4/06* (2013.01); *H04L 1/1607* (2013.01); *H04L 1/1829* (2013.01);
(Continued)

(58) Field of Classification Search
USPC ........ 370/328, 338, 389, 390, 392, 401, 432
See application file for complete search history.

(56) References Cited

U.S. PATENT DOCUMENTS 6,269,080 B1    7/2001    Kumar
6,839,565 B2    1/2005    Sarkkinen et al.
(Continued)

FOREIGN PATENT DOCUMENTS

CN    1886667 A    12/2006
JP    2000059294    2/2000
(Continued)

OTHER PUBLICATIONS

IEEE 802.16 Standard-2004 (Revision of IEEE Std 802. 16-2001), 892 pages.
(Continued)

*Primary Examiner* — Ricky Ngo
*Assistant Examiner* — Christine Ng
(74) *Attorney, Agent, or Firm* — Shichrur & Co.

(57) ABSTRACT

Method and apparatus for reliable multicast communication over wireless network are provided. According to embodiments of the invention, the method includes determining a priority category for a multicast communication to be transmitted. The method includes designating, for the multicast communication, one of the multicast communication recipients as a leader based on the priority category and multicast diagnostics information received from the multicast communication recipients. The leader is assigned to transmit to the multicast communication source an acknowledgment frame indicating receipt of a multicast communication frame received from the source.

9 Claims, 2 Drawing Sheets

(51) Int. Cl.
*H04L 1/16* (2006.01)
*H04L 1/18* (2006.01)
*H04L 12/18* (2006.01)
*H04L 12/801* (2013.01)
*H04L 12/851* (2013.01)
*H04L 1/00* (2006.01)
*H04W 72/12* (2009.01)

(52) U.S. Cl.
CPC .......... *H04L 12/1868* (2013.01); *H04L 47/10* (2013.01); *H04L 47/14* (2013.01); *H04L 47/15* (2013.01); *H04L 47/2433* (2013.01); *H04L 47/2441* (2013.01); *H04L 2001/0093* (2013.01); *H04W 72/1242* (2013.01)

(56) References Cited

U.S. PATENT DOCUMENTS

| | | | | |
|---|---|---|---|---|
| 7,013,157 | B1* | 3/2006 | Norman | H04L 1/1867 370/350 |
| 7,539,489 | B1 | 5/2009 | Alexander | |
| 7,757,103 | B2 | 7/2010 | Savransky et al. | |
| 7,864,768 | B2 | 1/2011 | Metzler et al. | |
| 2001/0046875 | A1 | 11/2001 | Davies | |
| 2002/0044557 | A1 | 4/2002 | Isoyama | |
| 2003/0083069 | A1* | 5/2003 | Vadgama | H04W 36/22 455/436 |
| 2003/0157949 | A1 | 8/2003 | Sarkkinen et al. | |
| 2004/0005889 | A1 | 1/2004 | Nishimura et al. | |
| 2004/0184427 | A1 | 9/2004 | Lynch et al. | |
| 2005/0125688 | A1 | 6/2005 | Ogawa et al. | |
| 2005/0232208 | A1* | 10/2005 | Hansen | H04L 1/0003 370/338 |
| 2006/0262795 | A1* | 11/2006 | Mamillapalli | H04L 12/1868 370/390 |
| 2007/0091889 | A1* | 4/2007 | Xiao | H04L 1/1854 370/390 |
| 2007/0160046 | A1* | 7/2007 | Matta | H04L 12/1868 370/390 |
| 2008/0002691 | A1* | 1/2008 | Qi | H04L 12/1868 370/390 |
| 2008/0005637 | A1* | 1/2008 | Chang | H04L 1/1685 714/748 |
| 2008/0031179 | A1 | 2/2008 | Gao et al. | |
| 2008/0071688 | A1 | 3/2008 | Corbett et al. | |
| 2008/0089331 | A1* | 4/2008 | Metzler | H04L 1/1867 370/390 |
| 2008/0181159 | A1* | 7/2008 | Metzler | H04L 1/1607 370/312 |
| 2008/0232291 | A1 | 9/2008 | Hus et al. | |
| 2010/0037270 | A1 | 2/2010 | Bennett | |
| 2010/0080200 | A1 | 4/2010 | Stewart | |

FOREIGN PATENT DOCUMENTS

| | | |
|---|---|---|
| JP | 2001177566 | 6/2001 |
| JP | 2003511925 | 3/2003 |
| JP | 2005268997 | 9/2005 |
| JP | 2006014103 | 1/2006 |
| KR | 100606469 | 7/2006 |
| RU | 2251219 | 4/2005 |
| RU | 2005102606 | 8/2005 |
| WO | 0126397 | 4/2001 |
| WO | 2004/084488 A1 | 9/2004 |
| WO | 2006020970 | 2/2006 |
| WO | 2006107886 | 10/2006 |
| WO | 2008091893 | 7/2008 |
| WO | 2010111420 | 9/2010 |

OTHER PUBLICATIONS

IEEE-Std. 802.11, 1999 Edition (ISO/IEC 8802-11: 1999), 527 pages.
IEEE-Std. 802.11a-1999 (Supplement to IEEE Std 802.11-1999), 91 pages.
IEEE-Std. 802.11b, 1999 edition (Supplement to ANS/IEEE Std 802.11, 1999 Edition), 96 pages.
IEEE-Std. 802.11g TM-2003 (Amendment to IEEE Std. 802.11 TM. 1999 edition (Reaff 2003), 78 pages.
International Search Report for PCT Patent Application No. PCT/US2008/051705, mailed on Jun. 19, 2008, 2 pages.
International Preliminary Report on Patentability and Written Opinion for PCT Patent Application No. PCT/US2008/051705, mailed on Jun. 19, 2008, 7 pages.
Search Report for European Patent Application No. 08728080.6, mailed on Nov. 22, 2011, 9 pages.
Office Action for Korean Patent Application No. 10-2009-7013477, mailed on Mar. 14, 2011, 5 pages, including 2 pages of English translation.
Office Action for Chinese Patent Application No. 200880001491.4, mailed on Aug. 9, 2011, 8 pages, including 4 pages of English translation.
Office Action for Japanese Patent Application No. 2009-547381, mailed on Nov. 8, 2011, 4 pages, including 2 pages of English translation.
Office Action for Russian Patent Application No. 2009124310, mailed on Jul. 19, 2010, 5 pages, including 2 pages of English translation.
Yongho Seok. et al., "Leader based Multicast Service Proposal", IEEE P802.11-07/0144r3, Wireless LANs, Mar. 2007, 17 pages.
Office Action for U.S. Appl. No. 11/476,828, mailed on Dec. 16, 2009, 18 pages.
Office Action for U.S. Appl. No. 11/476,828, mailed on Dec. 8, 2008, 15 pages.
Office Action for U.S. Appl. No. 11/476,828, mailed on Jun. 4, 2009, 15 pages.
Office Action for U.S. Appl. No. 11/657,544, mailed on Sep. 17, 2009, 18 pages.
Office Action for U.S. Appl. No. 11/657,544, mailed on Apr. 29, 2010, 17 pages.
Office Action for U.S. Appl. No. 11/657,544, mailed on Sep. 17, 2013, 30 pages.
Office Action for Chinese Patent Application Serial No. 201210377766.2 mailed on Sep. 29, 2014, 17 pages including 11 pages of English Translation.
Office Action for Chinese Patent Application No. 201210377766.2, mailed on Jun. 5, 2015, 15 pages, including 10 pages of English translation.
Office Action for Chinese Patent Application Serial No. 201210377766.2, mailed on Feb. 26, 2016, 13 pages (Including 9 pages of English translation).
Office Action for Chinese Patent Application No. 201210377766.2, mailed on Nov. 9, 2015, 14 pages (including 9 pages of English translation).
Office Action for Indian Patent Application Serial No. 4267/DELNP/2009, mailed on Jan. 27, 2016, 2 pages.
Reexamination Decision for Chinese Patent Application No. 201210377766.2, mailed on Feb. 21, 2017, 11 pages (Including 1 page of English translation).

\* cited by examiner

APPARATUS, SYSTEM AND METHOD OF GROUP TRANSMISSION ACKNOWLEDGEMENT

CROSS REFERENCE

This application is a Continuation application of U.S. patent application Ser. No. 11/657,544, filed Jan. 25, 2007, the entire disclosure of which is incorporated herein by reference.

BACKGROUND OF THE INVENTION

Reliable multicast and broadcast of wireless communications are gaining importance with the development in technology. In organizations this may be exemplified by the fact multicast and broadcast are becoming a required capability for delivery of live conference, web training, and wireless network management. In home networking, broadcast video streaming can be used for home entertainment and gaming. In hospital environments, broadcast can be used for commercial advertisement and television broadcasting.

Existing communication protocols such as IEEE-Std 802.11, 1999 Edition (ISO/IEC 8802-11: 1999) standard do not support reliable multicast/broadcast due to their inability to exchange acknowledgment messages (ACK) with multiple recipients. Obtaining a level of reliability in a multicast communication may be achieved by designating for a given wireless network, a leader station to respond to the multicast traffic with an ACK, thereby notifying the multicast source that the packet was successfully delivered to at least the leader. However, the higher reliability may cause a longer delay or lower overall network throughput as the reliability is achieved by the retransmission of packets in the network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
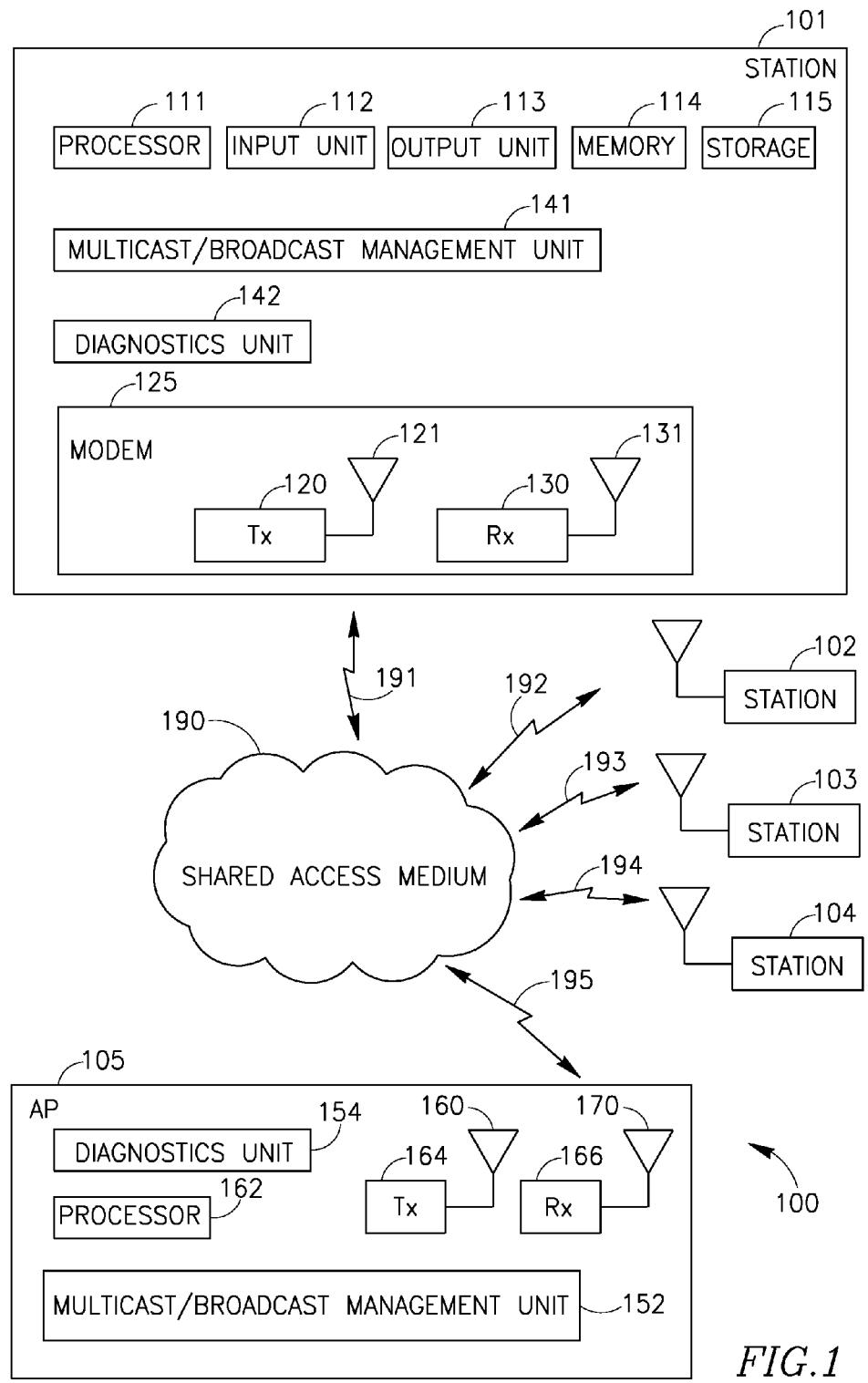
FIG. 1 is a schematic block diagram of an exemplary wireless communication system according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may provide a method for dynamic adaptation of a leader node assignment for broadcast and multicast traffic in a wireless network through the use of network characterization and traffic type. According to embodiments of the invention, the method may include assigning each multicast stream an independent leader based on the characteristics of the traffic stream and the distribution requirement for the particular type of traffic.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11 h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Although the scope of the present invention is not limited in this respect, the wireless communications technologies may include radio frequency (RF) and infrared. Non-limiting examples of RF wireless standards are protocols, such as, for example, Bluetooth, IEEE-Std 802.11a, IEEE-Std 802.11b, 1999 edition, IEEE-Std 802.11g and HomeRF. Non-limiting examples of infrared light signals are protocols, such as, for example, InfraRed Data Association (IrDA) standard.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the term "multicast/broadcast" as used herein may include, for example, multicast communication, broadcast communication, wireless multicast communication, wired multicast communication, wireless broadcast communication, wired broadcast communication, multicast communication over the Internet or over a global communication network, broadcast communication over the Internet or over a global communication network, multicast communication using TCP/IP, broadcast communication using TCP/IP, webcast communication (e.g., using the World Wide Web), and/or other types of communication, e.g., non-unicast communication.

Reference is now made to FIG. 1, which schematically illustrates a block diagram of an exemplary wireless communication system 100 able to utilize multicast/broadcast communication according to a demonstrative embodiment of the invention. System 100 may include one or more wireless communication stations, for example, stations 101, 102, 103 and 104. System 100 may include a wireless Access Point (AP) 105. Stations 101-104 may be referred to as multicast/broadcast recipient devices and AP 105 may be referred to as multicast/broadcast source device.

In some embodiments, stations 101-104 and AP 105 may communicate using a shared access medium 190, for example, through wireless communication links 191-195, respectively. In some embodiments, stations 101-104 and AP 105 may be able to communicate in accordance with a wireless communication standard or protocol, for example, as defined by IEEE-Std 802.11, 1999 Edition (ISO/IEC 8802-11: 1999) standard, IEEE 802.16 standard, or the like.

According to some embodiments, for example, AP 105 may transmit data intended to be received by more that one station using multicast or broadcast. For example, AP 105 may use multicast to transmit data to a group of stations of system 100, may use broadcast to transmit data to substantially all possible listening devices of system 100, may utilize a limited broadcast mechanism based on a network segment, may utilize a direct broadcast mechanism to transmit data to host devices of system 100, or the like. In some embodiments, the multicast/broadcast may be over a wireless mesh network, an ad-hoc network, a Basic Service Set (BSS), an Independent BSS (IBSS), an infrastructure network, or the like.

Station 101 may include, for example, a processor 111, an input unit 112, an output unit 113, a memory unit 114, a storage unit 115, and a modem having a transmitter 120 and a receiver 130. Station 101 may optionally include other suitable hardware components and/or software components. In some embodiments, the components of station 101 may be enclosed in, for example, a common housing, packaging, or the like.

Processor 111 may include, for example, a Central Processing Unit (CPU), a Digital Signal Processor (DSP), a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may, for example, process signals and/or data transmitted and/or received by station 101.

Input unit 112 may include, for example, a keyboard, a keypad, a mouse, a touch-pad, a stylus, a microphone, or other suitable pointing device or input device. Output unit 113 may include, for example, a Cathode Ray Tube (CRT) monitor or display unit, a Liquid Crystal Display (LCD) monitor or display unit, a screen, a monitor, a speaker, or other suitable display unit or output device.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, or other suitable removable or non-removable storage units. Memory unit 114 and/or storage unit 115 may, for example, store data transmitted and/or received by station 101.

Transmitter 120 may include, for example, a wireless Radio Frequency (RF) transmitter able to transmit wireless RF signals, e.g., through an antenna 121. Receiver 130 may include, for example, a wireless RF receiver able to receive wireless RF signals, e.g., through an antenna 131. In some embodiments, for example, transmitter 120 and/or receiver 130 may be implemented using a transceiver or a transmitter-receiver, using modem 125, using a Network Interface Card (NIC), or one or more units able to perform separate or integrated functions of transmitting and/or receiving wireless communication signals, blocks, frames, transmission streams, packets, messages and/or data.

Antenna 121 and/or antenna 131 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data. In some embodiments, optionally, antenna 121 and antenna 131 may be implemented using a common or single antenna, e.g., a transmit/receive antenna, or using a common set of transmit/receive antennas.

In some embodiments, station 101 or one or more of stations 101-104 may include, for example, a management and control unit 141 and a diagnostics unit 142. Management unit 141 may perform operations related to the multicast/broadcast communication, for example, to exchange protocol messages with regard to "leader" assignment, to manage the diagnostics unit 142, or to perform other operations related to the multicast/broadcast communication in accordance with some embodiments of the invention. The multicast/broadcast management unit 141 and/or the diagnostics unit 142 may optionally be implemented, for example, using separate components or units, using an integrated or combined unit, using hardware component(s), using software component(s), as part of processor 111, as part of modem 125, or the like.

Diagnostics unit 142 may perform analysis operations and may generate diagnostics information to be transmitted to AP 105. The diagnostic information generated by diagnostics unit 142 of station 101 may include, but not limited to, a received multicast/broadcast frame count, received channel power indicator (RCPI) associated with one or more received multicast/broadcast frames (e.g., with the latest received or most recently received multicast/broadcast frame), received signal-to-noise indicator (RSNI) associated with one or more received multicast/broadcast frames (e.g., with the most recently received multicast/broadcast frame) or quality indicators associated with one or more received multicast frames or with the incoming multicast/broadcast transmission. It should be understood that embodiments of the invention are not limited to the above-mentioned diagnostic information and that are metrics may be reported by diagnostic unit 142 to AP 105.

In accordance with some embodiments of the invention, one or more of stations 101-104 may transmit the diagnostics information to AP 105, for example, periodically, at pre-defined time intervals, upon demand, autonomously, when a pre-defined condition is met, in response to a triggering event, or the like.

AP 105 may include, for example, antennae 160 and 170, a processor 162, a transmitter 164 and a receiver 166. Although the scope of the present invention is not limited in this respect, antennae 160 and 170 may be omni-directional antennae, monopole antennae, dipole antennae, end fed antennae, circularly polarized antennae, micro-strip antennae, diversity antennae, GPS antennae or the like. The two antennae may be different, e.g.; one may be a dipole and the other end fed. In some embodiments, transmitter 164 may be coupled to antenna 160 and receiver 166 coupled to antenna 170. In other embodiments of this invention, transmitter 164 and receiver 166 may both be coupled to a single antenna 160.

AP 105 may further include a multicast/broadcast management and control unit 152 able to perform operations related to management of the multicast/broadcast communication, for example, to analyze the incoming multicast/broadcast diagnostics information, to select or re-select leader station(s), to monitor the incoming multicast/broadcast diagnostics information, to monitor the received (or expected to be received) multicast/broadcast acknowledgment frames, to activate or de-activate (or otherwise modify) a multicast/broadcast acknowledgment scheme, or the like. The multicast/broadcast management unit 152 may optionally be implemented, for example, using separate components or units, using an integrated or combined unit, using hardware component(s), using software component(s), as part of a processor or a modem of AP 105, or the like.

According to embodiments of the present invention, AP 105 may include a diagnostics unit 154 able to perform analysis and characterization of a communication transmitted by AP 105 to a plurality of stations via multicast or broadcast and to perform analysis operations related to diagnostics information received from one or more of stations 101-104, and the like. The analysis may include determining the traffic reliability characterization of the stream. For example, one transmission may be a commercial or advertisement and it may be acceptable that most, but not all, stations receive the traffic, and one may be an emergency multicast message or network management message and it may be desirable that a maximal number of stations receive the traffic.

The analysis and characterization may be done through various means including, but not limited to, information technology (IT) based set of rules, application level traffic assignment, and an automated heuristic analysis of multicast traffic streams based on established patterns and/or network conditions.

According to embodiments of the present invention, diagnostics unit 154 may further select the most suitable diagnostic metric for assigning a "leader" station according to the type of the traffic stream transmitted by AP 105. For example, for a multicast of a video stream a first diagnostic metric may be selected and for a data stream a different diagnostic metric may be selected. In some situations, it may be crucial the information be transmitted as quickly as possible so that the data's latency is an important measure. For other multicasts, accuracy may be most important such that the frame loss rate and the signal's S/N ratio may be the relevant metrics.

In accordance with some embodiments of the invention, for a given multicast, diagnostic unit 154 may select a leader station among all multicast/broadcast recipients according to the selected diagnostic metric based on the characterization of the multicast communication and the diagnostics information received from the multicast/broadcast recipients (stations 101-104).

In some embodiments, one of stations 101-104 may be designated (e.g., by AP 105) to operate as a "leader" station (e.g., an acknowledger station, an acknowledgement sender station, a confirming station, a designated station, an assigned station, a selected station, a selectively designated station, an appointed station, an elected station, a representative station, a representative recipient station, or the like) for a selected multicast, based on the metrics associated with that multicast.

In a demonstrative embodiment, for example, station 101 may be designated as leader station, whereas stations 102-104 may not be designated as leader stations—for a given multicast. The leader station 101 may, for example, exchange protocol messages with AP 105. For example, when the leader station 101 receives a multicast/broadcast frame from AP 105, the leader station 101 may transmit an acknowledgment (ACK) packet or message to AP 105. However, station 104 may be designated as leader for the next multicast by the AP 105. This may be due, in part or completely, to the fact different sets of metrics are used for the two transmissions, to some physical change in the environment between the two broadcasts, to the difference in the quality of the two multicasts, some combination of factors, or other set of factors not mentioned.

Figure 2:
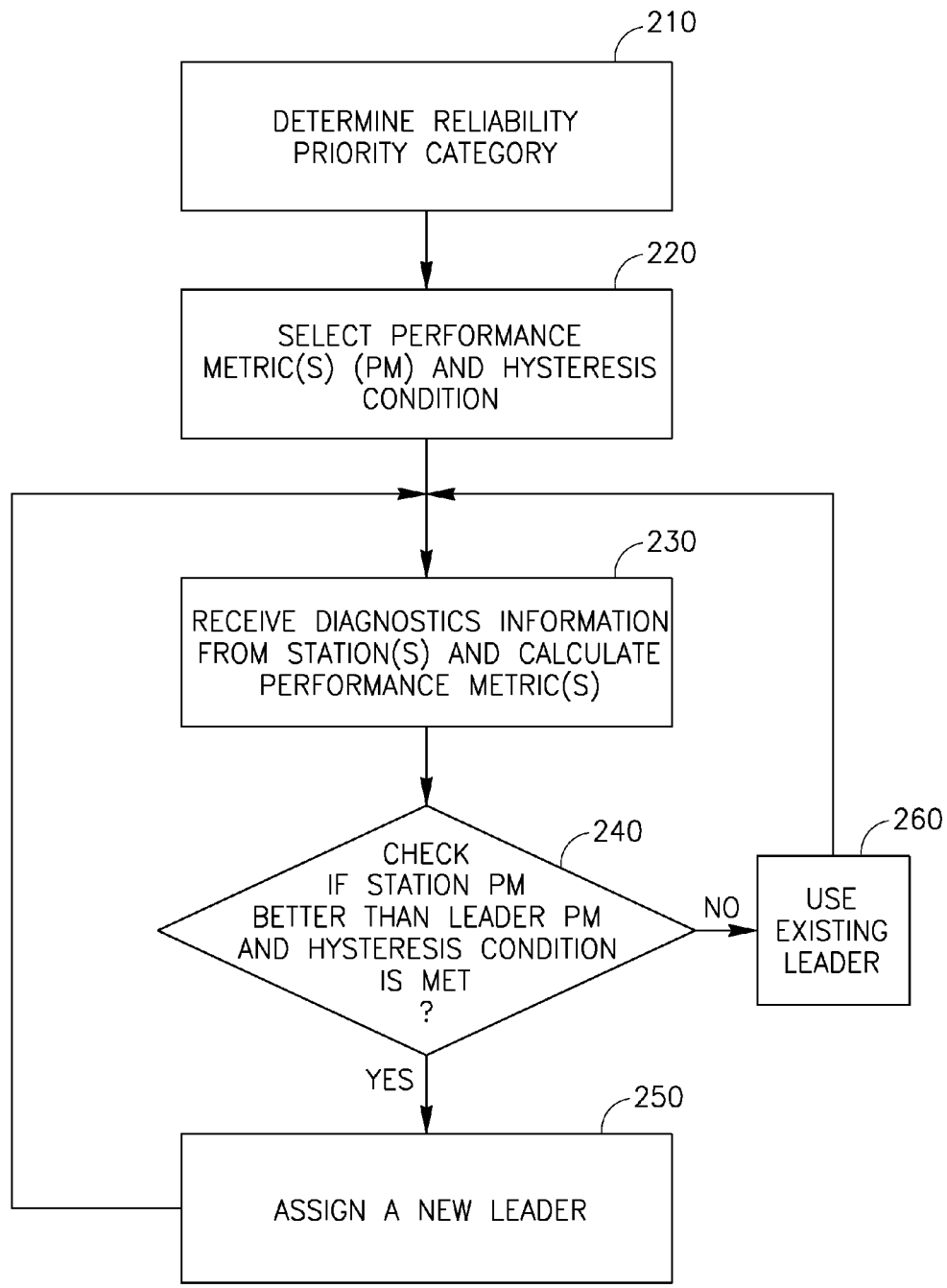
FIG. 2 is a schematic flow-chart diagram of a method of multicast communication according to some embodiments of the invention.

Reference is additionally made to FIG. 2, which is a schematic flow-chart diagram of a method of multicast communication according to some exemplary embodiments of the invention. This procedure, as illustrated, may be performed for each multicast or broadcast. Operations of the method may be implemented, for example, by system 100 of FIG. 1, by any or all of stations 101-104 of FIG. 1, by AP 105 of FIG. 1, and/or by other suitable units, devices, and/or systems.

As indicated at box 210, the method may include performing analysis and characterization of a communication transmitted by AP 105 to a plurality of stations via multicast or broadcast and determining the traffic reliability characterization of the stream. This may, in some embodiments of the invention, include assigning a priority category to each type of multicast/broadcast traffic.

As indicated at box 220, the method may include determining an appropriate performance metric or metrics, based on the characterization of a given multicast or broadcast, e.g.; emergency broadcasts may be assigned the highest priority category and the appropriate metric for such broadcasts may be the frame loss rate (FLR). Once the performance metric has been selected, an initial threshold value may be set, e.g.; for emergency broadcasts, the leader may be the station with the lowest FLR and so the FLR threshold may initially be set to 100% so that all responding stations have a better—lower—FLR. In cases where the selected performance metric is to be maximized, the initial value for the threshold may be set at the minimal possible value so that all responding stations have a better—higher—value.

Later, an initial leader may be selected by choosing the station initially having the lowest FLR. Note that, if FLR is used, the value each station—any or all of stations 101-104 in this embodiment—actually reports to the AP 105 may be frame count. AP 105 may determine FLR from frame count because the AP 105 "knows" how may frames were broadcast.

In some embodiments of the invention and for some metrics, it may be desirable to set up an hysteresis condition (text box 220). Otherwise, as some metrics may change very rapidly, the designated leader may be constantly varying. Thus, rather than setting the current performance threshold used for designating the leader as the leader's prior performance, it may be beneficial to adjust the threshold upward a certain percentage—from the leader's prior metric, e.g.; if the metric is one to be maximized, the threshold may be set at 20% greater than the leader's prior measured performance and, if the metric is to be minimized, the threshold may be set at 10% lower than the leader's prior performance.

According to other embodiments of the invention, the threshold may simply be set equal to the current leader's current performance or the threshold may be a fixed value determined by the type of multicast/broadcast or a requirement associated with the multicast/broadcast.

As indicated at box 230, the method may optionally include, for example, the AP 105 receiving multicast/broadcast diagnostics information generated by stations 101-104 or other multicast/broadcast recipients and calculating a selected performance metric based on the received information, for each reporting station. The diagnostics information may include, for example, received multicast/broadcast frame count, received signal strength indicator, packet error rate, signal to noise ratio, measured latency, measured jitter, or other information and may or may not be limited to metrics used in determining the chosen performance metric for the multicast/broadcast.

AP 105 may calculate or estimate a different performance metric or set of performance metrics for each type of multicast/broadcast; for example, a FLR associated with a station, an average FLR per station, an average received signal-to-noise (SNR) per station, an average received signal strength per station (RSSI), an average latency per station, an average jitter per station, or the like, and/or any combination of the metrics mentioned and any other sorts of metrics as may be deemed useful for particular types of transmissions.

According to embodiments of the present invention, the method may include, for example, assigning as a leader the best-performing station associated the best-performance metric. AP 105 may then periodically analyze the diagnostics information received from station 101-104 and based on comparison between the performance metrics of the stations and the leader using the chosen hysteresis value may decide whether a leader re-assignment is required. If the leader's performance begins to drop significantly, as pre-defined by a specific amount or percentage, some embodiments of the invention may initiate a new leader selection loop, as described in boxes 240-260.

As indicated by diamond block 240, if the selected performance metric is one to be maximized, AP 105 may check whether the performance metric of an unassigned station, for example station 103, is greater than the performance metrics of the leader and that the hysteresis condition is met. If so, then station 103 is assigned as the new leader by AP 105 (box 250). If not, then the current leader station, station 101 may remain the leader (box 260).

Likewise, if the selected performance metric is one to be minimized, AP 105 may check whether the performance metric of an unassigned station, for example station 103, is smaller than the performance metrics of the leader and that the hysteresis condition is met. If so, then station 103 is assigned as the new leader by AP 105 (box 250). If not, then the current leader station, station 101 may remain the leader (box 260).

According to embodiments of the invention, each time the decision is made to assign a leader and a potential leader has been identified, the management and control unit 152 of AP 105 may transmit a multicast/broadcast leader assignment request to management and control unit 141 of station 101. In response, management unit 141 may transmit a multicast/broadcast leader assignment response to management unit 152 of AP 105. Diagnostics unit 152 of AP 105 may transmit a multicast/broadcast diagnostics information request to diagnostics unit 142 of station 101. In response, diagnostics unit 142 of station 101 may transmit a multicast/broadcast diagnostics information report (or other suitable response) to the diagnostics unit 154 of AP 105.

In some embodiments, optionally, communication between AP 105 and/or station 101 (e.g., ACK packet or message, request to designate as leader, response to the request to designate as leader, or the like) may utilize a request-to-send (RTS) mechanism, a clear-to-send (CTS) mechanism, a RTS/CTS mechanism, or other suitable protocol mechanisms.

In some embodiments, leader station 101 may transmit a notification to AP 105—at any time during broadcasts/multicasts—to indicate that leader station 101 is about to disconnect (e.g., move out, log off, or otherwise leave or exit) from a wireless network common to AP 105 and leader station 101, or that AP 105 has already disconnected from such wireless network. In response, the AP 105 may designate another station as "leader" for the remainder of the multicast, for example, based on diagnostics information received from one or more of the stations 102-104 that remain in the wireless network.

In some embodiments, a "leader"-based multicast/broadcast acknowledgment scheme may, for example, increase the reliability of multicast/broadcast communication, increase overall network performance, increase overall network throughput. Some embodiments may, for example, provide a link level reliability indicator to a multicast/broadcast communication source. Embodiments of the invention may allow additional and/or other benefits or advantages.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Other operations or sets of operations may be used in accordance with embodiments of the invention.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus of a wireless communication access point, the apparatus comprising:
   a transmitter component;
   a receiver component;
   one or more antennas coupled to the transmitter component and the receiver component; and
   a processor component configured to selectively request two or more stations of a group of stations, which includes a plurality of stations, to acknowledge group transmissions to be transmitted from said access point to said group of stations, said processor component configured to select the two or more stations of the group of stations based on at least a priority category corresponding to the group transmissions.

2. The apparatus of claim 1, wherein at least one station of the group of stations is not included in the two or more stations, which are to be requested to acknowledge said group transmissions.

3. The apparatus of claim 1, wherein said transmitter component is to transmit a first wireless group transmission addressed to the group of stations, to request a first station of the group of stations to acknowledge receipt of the first group transmission, and the receiver component is to receive an acknowledgement from said first station to acknowledge said first group transmission,
   and wherein said transmitter component is to transmit a second wireless group transmission addressed to the group of stations, to request a second station of the group of stations to acknowledge receipt of the second group transmission, and the receiver component is to receive an acknowledgement from said second station to acknowledge said second group transmission.

4. The apparatus of claim 1, wherein said processor component is to select the two or more stations of the group of stations based on a predefined selection metric.

5. The apparatus of claim 4, wherein the selection metric is based on a type of traffic of said group transmissions.

6. The apparatus of claim 4, wherein the selection metric is based on network conditions for communicating said group transmissions.

7. The apparatus of claim 1 configured to apply a protection mechanism to protect communications with said group of stations.

8. The apparatus of claim 7, wherein said protection mechanism comprises a Request to Send (RTS)/Clear to Send (CTS) mechanism.

9. The apparatus of claim 1, wherein said access point and said group of stations are part of a Basic Service Set (BSS).

* * * * *